United States Patent
Kuehn et al.

(10) Patent No.: US 11,984,767 B2
(45) Date of Patent: May 14, 2024

(54) LIQUID COOLED POLE WEDGE

(71) Applicant: HAMILTON SUNDSTRAND CORPORATION, Charlotte, NC (US)

(72) Inventors: Daniel Kuehn, Roscoe, IL (US); Stephen Michael Bortoli, Roscoe, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 81 days.

(21) Appl. No.: 17/064,324

(22) Filed: Oct. 6, 2020

(65) Prior Publication Data

US 2021/0021166 A1 Jan. 21, 2021

Related U.S. Application Data

(62) Division of application No. 15/862,417, filed on Jan. 4, 2018, now Pat. No. 10,833,547.

(51) Int. Cl.
| | |
|---|---|
| *H02K 1/32* | (2006.01) |
| *H02K 3/24* | (2006.01) |
| *H02K 3/487* | (2006.01) |
| *H02K 3/52* | (2006.01) |
| *H02K 5/20* | (2006.01) |
| *H02K 15/00* | (2006.01) |

(52) U.S. Cl.
CPC .............. *H02K 1/325* (2013.01); *H02K 3/24* (2013.01); *H02K 3/487* (2013.01); *H02K 3/524* (2013.01); *H02K 3/527* (2013.01); *H02K 5/203* (2021.01); *H02K 15/0018* (2013.01)

(58) Field of Classification Search
CPC .............................. H02K 3/527; H02K 1/325
See application file for complete search history.

(56) References Cited

U.S. PATENT DOCUMENTS

| | | | |
|---|---|---|---|
| 4,943,746 | A | 7/1990 | Scherzinger et al. |
| 6,791,230 | B2 | 9/2004 | Tornquist |
| 7,146,707 | B2 | 12/2006 | Tornquist et al. |
| 7,342,331 | B2 | 3/2008 | Down |
| 7,786,630 | B2 | 8/2010 | Waddell et al. |
| 8,760,014 | B2 | 6/2014 | Birdi |
| 9,559,569 | B2 | 1/2017 | Huang |

(Continued)

FOREIGN PATENT DOCUMENTS

| | | |
|---|---|---|
| EP | 1983635 | 10/2008 |
| EP | 2660955 | 11/2013 |

(Continued)

OTHER PUBLICATIONS

European Patet Office, European Office Action dated Oct. 7, 2020 in Application No. 18248194.5.

(Continued)

*Primary Examiner* — Livius R. Cazan
(74) *Attorney, Agent, or Firm* — SNELL & WILMER L.L.P.

(57) ABSTRACT

A wedge for use between poles of a generator for supporting windings of the poles includes a plurality of outer walls. The wedge also includes at least one fluid orifice extending through at least one of the plurality of outer walls and configured to receive a fluid from a shaft of the generator and to allow the fluid to flow through the at least one of the plurality of outer walls to reduce a temperature of the windings.

10 Claims, 3 Drawing Sheets

(56) References Cited

U.S. PATENT DOCUMENTS

| | | | |
|---|---|---|---|
| 2003/0048015 A1* | 3/2003 | Tornquist | H02K 3/527 310/103 |
| 2005/0212373 A1 | 9/2005 | McDowall | |
| 2010/0133946 A1* | 6/2010 | Lemmers, Jr. | H02K 3/527 310/214 |
| 2016/0043613 A1* | 2/2016 | Patel | H02K 9/22 310/52 |

FOREIGN PATENT DOCUMENTS

| | | |
|---|---|---|
| WO | 03023940 | 3/2003 |
| WO | 2015034514 | 3/2015 |

OTHER PUBLICATIONS

European Patet Office, European Office Action dated Nov. 12, 2021 in Application No. 18248194.5.
European Patent Office, European Search Report dated May 8, 2019 in Application No. 18248194.5.
USPTO, Restriction/Election Requirement dated Feb. 21, 2020 in U.S. Appl. No. 15/862,417.
USPTO, Non-Final Office Action dated Jun. 2, 2020 in U.S. Appl. No. 15/862,417.
USPTO, Notice of Allowance dated Jul. 10, 2020 in U.S. Appl. No. 15/862,417.

* cited by examiner

LIQUID COOLED POLE WEDGE

CROSS REFERENCE TO RELATED APPLICATIONS

This application is a division of application serial number U.S. Ser. No. 15/862,417 filed Jan. 4, 2018 for LIQUID COOLED POLE WEDGE.

FIELD

The present disclosure is directed to electric generators and, more particularly, to systems and methods for cooling electric generators.

BACKGROUND

Generators may include poles, that rotate about an axis, and stators radially outward from the poles. Windings may be wrapped around the poles. During rotation of the poles relative to the stators, an electric field may be generated between the magnetic stators and the windings that creates a current. The current may be used to power electrical devices.

Based on the rotational speed of the poles, the windings experience a centrifugal force that forces the windings away from the poles. In that regard, a wedge may be placed between pairs of poles to reduce movement of the windings during such rotation and to relieve the load applied to the windings. However, this load relief may, when combined with potentially increased temperatures, undesirably create stress in the windings.

SUMMARY

Described herein is a wedge for use between poles of a generator for supporting windings of the poles. The wedge includes a plurality of outer walls. The wedge also includes at least one fluid orifice extending through at least one of the plurality of outer walls and configured to receive a fluid from a shaft of the generator and to allow the fluid to flow through the at least one of the plurality of outer walls to reduce a temperature of the windings.

In any of the foregoing embodiments, the wedge further includes a wedge channel configured to receive the fluid and to allow the fluid to flow to the at least one fluid orifice.

In any of the foregoing embodiments, the at least one fluid orifice includes a plurality of fluid orifices, and the wedge channel is configured to allow the fluid to flow to each of the plurality of fluid orifices.

In any of the foregoing embodiments, the plurality of outer walls includes two radially inward walls that join at a junction proximal to the shaft, and wherein the wedge channel is configured to receive the fluid from a core of the generator at the point.

Any of the foregoing embodiments may also include at least one support wall, wherein the plurality of outer walls defines an internal wedge cavity and the at least one support wall is located in the internal wedge cavity and configured to provide structural support for the plurality of outer walls.

In any of the foregoing embodiments, the plurality of outer walls includes three radially outward walls that together define a wedge shape, and two radially inward walls that join at a junction proximal to the shaft and are each curved.

In any of the foregoing embodiments, the at least one fluid orifice extends in a direction parallel to an axis of the generator.

In any of the foregoing embodiments, the wedge is additively manufactured.

Also disclosed is a generator. The generator includes a shaft configured to rotate about an axis. The generator also includes a core coupled to the shaft and including at least two poles configured to rotate about the axis in response to rotation of the shaft. The generator also includes a wedge configured to be positioned between two of the at least two poles of the core and including a fluid orifice extending through at least a portion of the wedge and configured to allow a fluid to flow through at least the portion of the wedge to reduce a temperature of the windings.

In any of the foregoing embodiments, the shaft defines a fluid channel and the core further includes or defines a transfer tube extending from the fluid channel of the shaft to the wedge such that the fluid flows from the fluid channel, through the transfer tube, and into the fluid orifice of the wedge.

In any of the foregoing embodiments, the core has an axial end and the transfer tube is positioned on the axial end of the core.

In any of the foregoing embodiments, the wedge includes a plurality of outer walls including two radially inward walls that join at a junction proximal to the core, and wherein the transfer tube provides the fluid to the wedge at the point.

In any of the foregoing embodiments, the wedge further includes a plurality of fluid orifices including the fluid orifice, and the wedge further includes a wedge channel configured to receive the fluid and to allow the fluid to flow to at least a portion of the plurality of fluid orifices.

In any of the foregoing embodiments, the wedge further includes a plurality of outer walls defining an internal wedge cavity and at least one support wall extending through a portion of the internal wedge cavity and configured to provide structural support for the plurality of outer walls.

In any of the foregoing embodiments, the wedge further includes a plurality of outer walls and the fluid orifice extends through at least one of the plurality of outer walls.

Any of the foregoing embodiments may also include windings wound around each of the at least two poles.

Also disclosed is a method of making a wedge, comprising additively manufacturing the wedge to have a plurality of outer walls and at least one fluid orifice extending through at least one of the plurality of outer walls to receive a fluid from a shaft of a generator to port the fluid through the at least one of the plurality of outer walls.

In any of the foregoing embodiments, additively manufacturing the wedge further includes additively manufacturing the wedge to cause the at least one fluid orifice to be parallel to an axis of a generator with which the wedge is configured for use.

In any of the foregoing embodiments, additively manufacturing the wedge further includes additively manufacturing the wedge to have a wedge channel configured to receive the fluid and to port the fluid to the at least one fluid orifice.

In any of the foregoing embodiments, additively manufacturing the wedge further includes additively manufacturing the wedge to have an integral transfer tube configured to port the fluid to the at least one fluid orifice.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
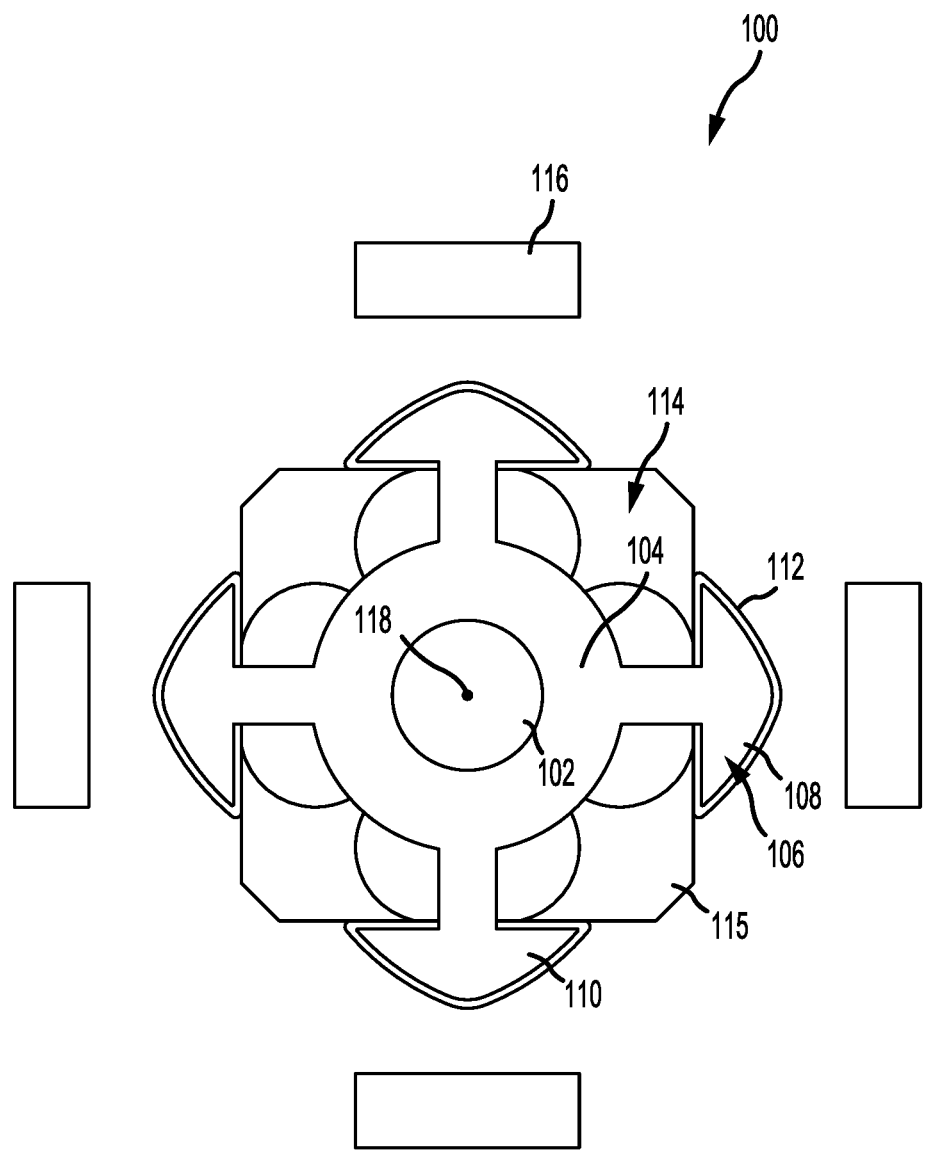
FIG. 1 is a cross-sectional view of a generator, in accordance with various embodiments of the present disclosure.

Referring to FIG. 1, a venerator 100 is shown. The generator 100 includes a shaft 102 having an axis 118. The generator 100 may further include a core 104 coupled to the shaft 102. The core 104 may include a plurality of poles 106 including a first pole 108 and a second pole 110.

One or more winding 112 may be wrapped around each of the plurality of poles 106. For example, windings 112 may be wound around the first pole 108. The windings 112 may include a wire or other conductor wrapped or wound around the first pole 108.

The generator 100 may further include a plurality of wedges 114 including a first wedge 115. Each of the plurality of wedges 114 may be located between two of the plurality of poles 106. For example, the first wedge 115 may be located or positioned between the first pole 108 and the second pole 110. The plurality of wedges 114 may resist outward movement of the windings 112 due to rotation of the core 104. For example, the first wedge 115 may contact the windings 112 of the first pole 108 and resist radially outward movement of the windings 112. The wedges 114 may resist outward movement of the windings 112 due to friction between the wedges 114, the windings 112, and the poles 106.

The generator 100 may further include a plurality of stators 116. In various embodiments, the plurality of stators 116 may be magnetized.

In operation, the shaft 102 may rotate about the axis 118. For example, rotational force to drive the shaft 102 may be provided by an engine, such as a gas turbine engine of an aircraft. Because the core 104 is coupled to the shaft 102, the core 104 may rotate along with the shaft 102. The wedges 114 may also rotate along with the shaft 102 and the core 104.

In various embodiments, a direct current (DC) signal may be provided through the windings 112 of the each of the poles 106. The windings on adjacent poles may alternate between negative and positive DC current. As the core 104 rotates about the axis 118, the windings 112 may generate a magnetic field, which may induce an alternating current (AC) signal in the stators 116, which may be used to power electronic equipment.

During operation, the wedges 114 may also develop or experience a current, thus increasing a temperature of the wedges 114. In various embodiments, the wedges 114 may operate at temperatures above 400 degrees Fahrenheit (204 degrees Celsius). Furthermore, the wedges 114 may experience a centrifugal force due to rotation about the axis 118. The combination of heat and centrifugal force may result in bending stresses experienced by the wedges 114.

Figure 2:
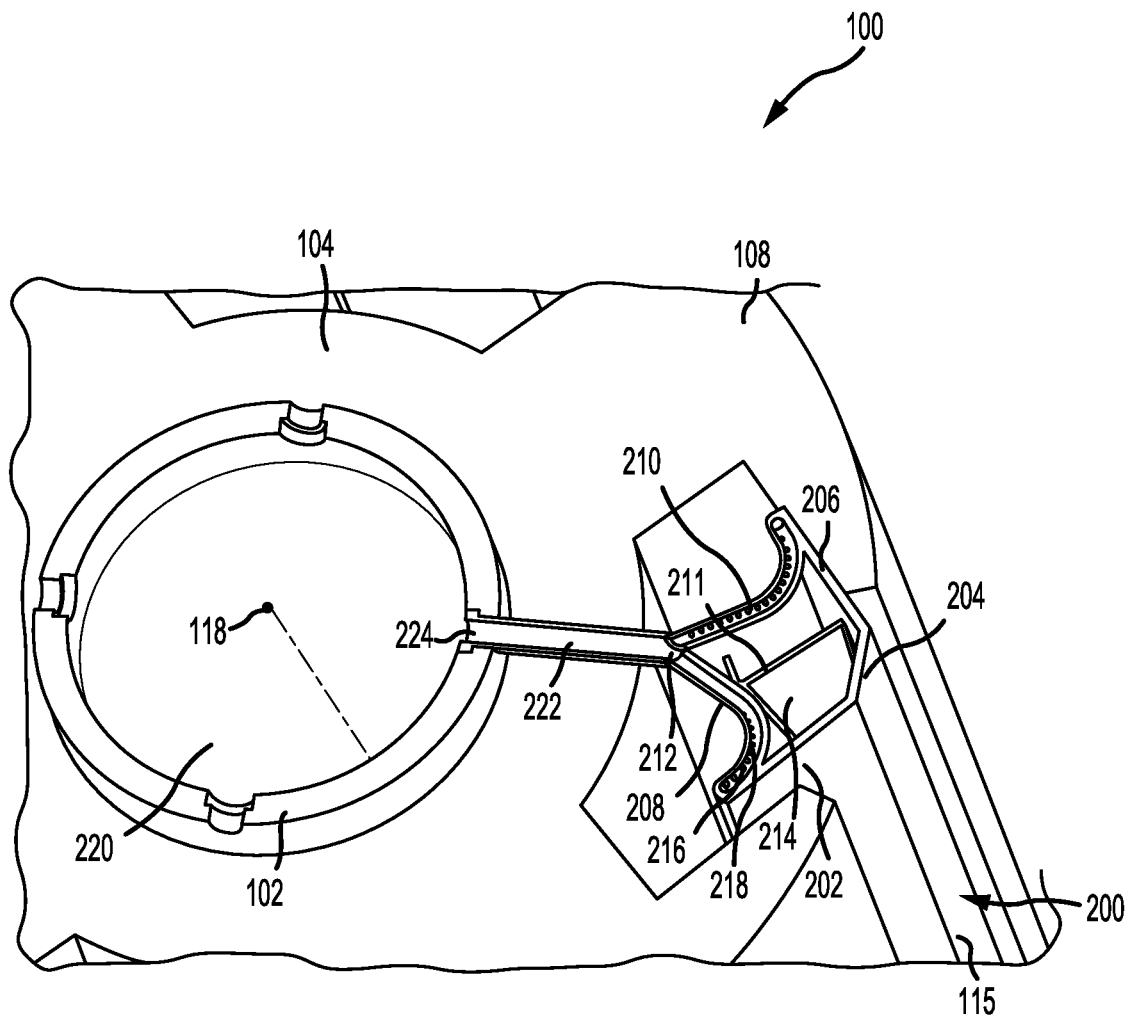
FIG. 2 is a perspective cross-sectional view of a portion of the generator of FIG. 1, in accordance with various embodiments of the present disclosure.

Turning to FIG. 2, the wedge 115 may include a plurality of outer walls 200 (202, 204, 206, 208, and 210). The plurality of outer walls may also be referred to as perimeter walls as they may define a perimeter of the wedge 115. The plurality of outer walls 200 may include a first radially outward wall 202, a second radially outward wall 204, and a third radially outward wall 206. The radially outward walls 202, 204, 206 may form a shape that resembles a wedge. The outer walls 200 may further include a first radially inward wall 208 and a second radially inward wall 210. The radially inward walls 208, 210 may be curved and extend from the first radially outward wall 202 and the third radially outward wall 206 towards a junction 212 proximal to the core 104.

The plurality of outer walls 200 may define an internal wedge cavity 214. In various embodiments, the wedge 115 may further include one or more support wall 211 extending through a portion of the internal wedge cavity 214. In various embodiments, the one or more support wall 211 may extend from one of the plurality of outer walls 200 to another of the plurality of outer walls 200. The one or more support wall 211 may provide structural support for the plurality of outer walls 200.

Inclusion of the one or more support wall 211 may allow the wedge 115 to be relatively hollow. That is, the internal wedge cavity 214 may exist because of the support provided by the one or more support wall 211. Inclusion of the internal wedge cavity 214 may provide advantages such as reduced weight of the wedge 115, resulting in increased efficiency of the generator 100.

The generator 100 may be designed with various features to reduce a temperature of the wedge 115 (thus reducing a temperature of the windings 112) to reduce the likelihood of the wedge 115 experiencing bending stress and the windings 112 experiencing undesirable stress. In particular, the wedge 115 may define or include a plurality of fluid orifices 216. The plurality of fluid orifices 216 may extend through a portion of the wedge 115, such as through a portion of one or more of the plurality of outer walls 200. In various embodiments, the plurality of fluid orifices 216 may extend through the wedge 115 in a direction that is parallel to the axis 118. In various embodiments, the plurality of fluid orifices 216 may extend through an entire length of the wedge 115.

The plurality of fluid orifices 216 may be located in one or more of the plurality of outer walls 200. In that regard, the plurality of fluid orifices 216 may transport a fluid (i.e., allow a fluid to flow) such as a coolant (i.e., oil) through the one or more outer wall 200. Heat from the outer walls 200 may be transferred away from the outer walls 200 by the fluid, thus reducing temperatures experienced by the outer walls 200.

The wedge 115 may further include a wedge channel 218. The wedge channel 218 may be designed to receive the fluid from the core 104 (originating from the shaft 102). In various embodiments, the wedge channel 218 may receive the fluid from the core 104 (originating from the shaft 102) at the junction 212 at which the first radially inward wall 208 and the second radially inward wall 210 meet. The wedge channel 218 may provide the fluid to one or more of the plurality of fluid orifices 216. In various embodiments, the wedge channel 218 may provide the fluid to each of the plurality of fluid orifices 216.

The shaft 102 may be at least partially hollow and may define or include a fluid channel 220. In various embodiments, the fluid may flow through the fluid channel 220 of the shaft 102.

The core 104 may define or include a transfer tube 222 in fluid communication with the fluid channel 220 and the wedge channel 218. In various embodiments, the transfer tube 222 may be manufactured to be a continuous piece with the wedge 115. For example, the transfer tube 222 may be coupled to the shaft 102 and receive the fluid from the shaft 102. In particular, the shaft 102 may define a fluid opening 224 that aligns with, and is in fluid communication with, the transfer tube 222. In that regard, the fluid from the fluid channel 220 may flow out of the fluid channel 220 and into the transfer tube 222 via the fluid opening 224. The fluid may then flow through the transfer tube 222 and into the wedge channel 218, from which it may flow through each of the plurality of fluid orifices 216.

Pressure to force the fluid along this path may be provided by rotation of the generator 100. In particular, rotation of the shaft 102 and the core 104 forces the fluid through the fluid channel 220 and radially outward into the transfer tube 222 and through the wedge channel 218 and the plurality of fluid orifices 216.

In various embodiments, the wedge 115 may be additively manufactured. In various embodiments, the wedge may be manufactured using casting and machining, or any other known manufacturing technique.

In various embodiments, the wedge 115 may include at least one of stainless steel, aluminum, titanium, an austenitic nickel-chromium-based alloy, such as a composition that by weight contains between 17% and 21% chromium, between 2.8% and 3.3% molybdenum, between What 50% to 55% nickel, and between 4.75% and 5.5% niobium (available as INCONEL 718 from the Special Metals Corporation Huntington, West Virginia, USA), or the like.

Figure 3:
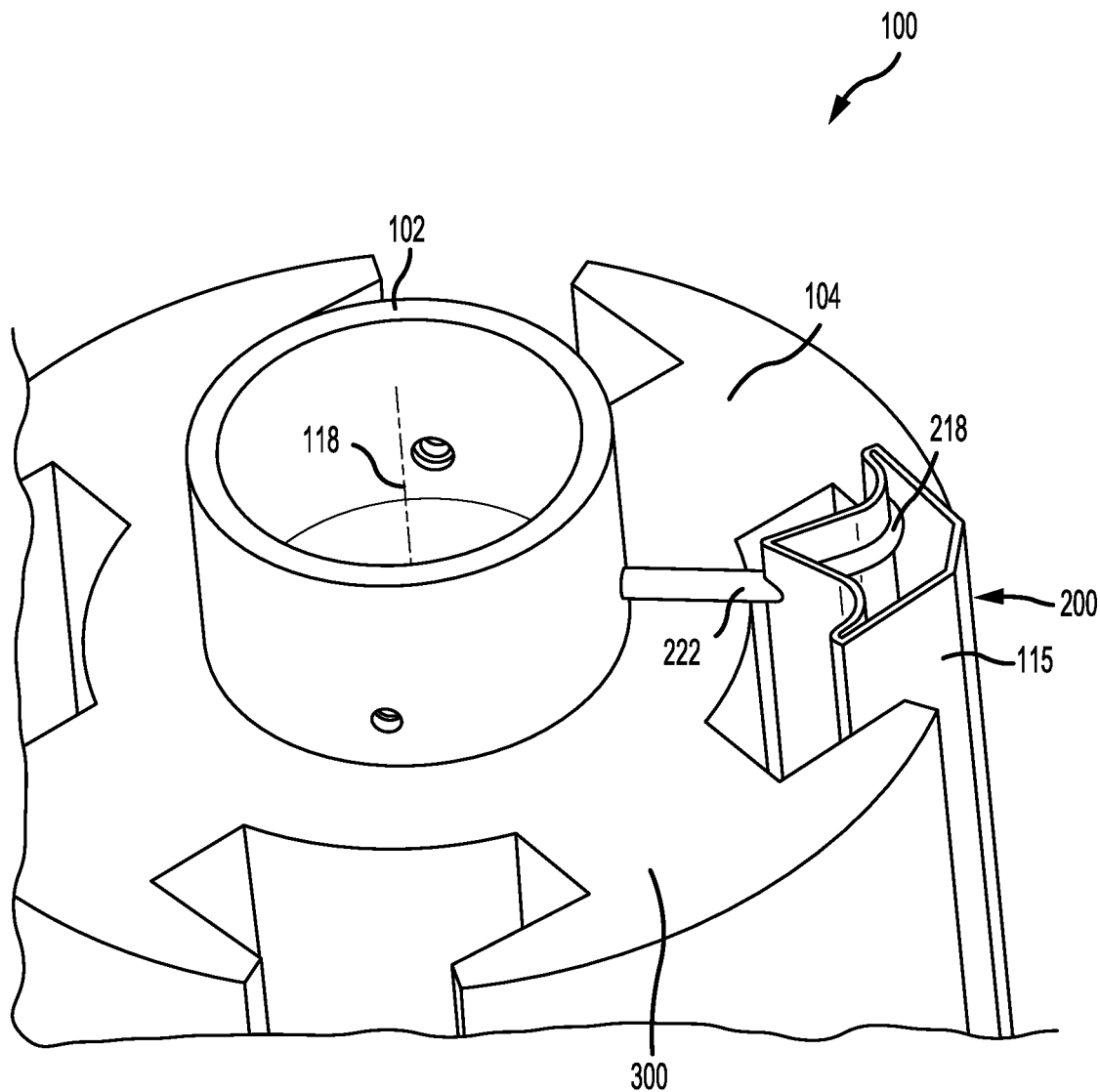
FIG. 3 is a perspective view of a portion of the generator of FIG. 1, in accordance with various embodiments of the present disclosure.

Turning now to FIG. 3, the core 104 may have an axial end 300. In various embodiments, the transfer tube 222 may be located at the axial end 300 of the core 104. In various embodiments, the transfer tube 222 may be separate from the core 104 as shown. In various embodiments, the transfer tube 222 may also or instead be defined by the core 104. In various embodiments, the transfer tube 222 may include one or more of a steel, a plastic, or the like.

In various embodiments, the wedge channel 218 of the wedge 115 may be separate from the wedge 115 as shown. In various embodiments, the wedge channel 218 may also or instead be defined by the wedge 115, such as by the outer walls 200. In various embodiments, the wedge channel 218 may include the same or different material as the wedge 115. In various embodiments, the wedge channel 218 may include a steel, a plastic, or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of making a wedge, comprising:
    additively manufacturing the wedge to have a plurality of outer walls and a transfer tube, the outer walls including three radially outward walls and two radially inward walls, the plurality of outer walls extending in an axial direction; and
    additively manufacturing a plurality of fluid orifices located in the two radially inward walls of the plurality of outer walls of the wedge, the plurality of fluid orifices extending in the axial direction through an entire length of the two radially inward walls of the plurality of outer walls of the wedge, the plurality of fluid orifices configured to receive a fluid from a shaft of a generator and to port the fluid through the two radially inward walls of the plurality of outer walls of the wedge, wherein the two radially inward walls that are configured to join at a junction proximal to the shaft and are each curved, the radially outward walls and the radially inward walls together defining an internal wedge, wherein the transfer tube extends through the junction formed by the two radially inward walls.

2. The method of claim 1, wherein additively manufacturing the wedge further includes additively manufacturing the wedge to cause the plurality of fluid orifices to be configured such that, once installed in the generator with which the wedge is configured for use, they are parallel to an axis of the generator.

3. The method of claim 1, wherein additively manufacturing the wedge further includes additively manufacturing the wedge to have a wedge channel configured to receive the fluid and to port the fluid to the plurality of fluid orifices.

4. The method of claim 3, wherein the wedge channel is additively manufactured to extend into an interior of the wedge.

5. The method of claim 1, wherein the transfer tube is configured to port the fluid to the plurality of fluid orifices.

6. The method of claim 1, wherein the additively manufacturing the wedge further includes additively manufacturing the wedge to be open at each axial end wherein the one or more of the plurality of outer walls extends in the axial direction between each open end.

7. The method of claim 1, wherein a first radially inward wall of the two radially inward walls is coupled to a first radially outward wall of the three radially outward walls and a second radially inward wall of the two radially inward walls is coupled to a second radially outward wall of another of the three radially outward walls.

8. The method of claim 1, wherein each of the three radially outward walls is linear and each of the two radially inward walls are curved.

9. The method of claim 8, wherein the making the wedge further includes making the two radially inward walls configured to join at a junction proximal to the shaft, the curve of each of the two radially inward walls extending from one of the three radially outward walls to the junction.

10. The method of claim 1, further comprising forming an interior face and an exterior face along a length of each of the plurality of outer walls, wherein the interior face is parallel with the exterior face along the length of each of the plurality of outer walls.

\* \* \* \* \*